US006814392B1

(12) United States Patent
Tomaszewski

(10) Patent No.: US 6,814,392 B1
(45) Date of Patent: Nov. 9, 2004

(54) LEAD SCREW DRIVE FOR A POWER LIFTGATE

(75) Inventor: Kris Tomaszewski, Newmarket (CA)

(73) Assignee: Atoma International Corp., Newmarket (CA)

( * ) Notice: Subject to any disclaimer, the term of this patent is extended or adjusted under 35 U.S.C. 154(b) by 0 days.

(21) Appl. No.: 10/311,990

(22) PCT Filed: Jun. 26, 2001

(86) PCT No.: PCT/CA01/01050

§ 371 (c)(1), (2), (4) Date: Dec. 19, 2002

(87) PCT Pub. No.: WO02/00459

PCT Pub. Date: Jan. 3, 2002

Related U.S. Application Data

(60) Provisional application No. 60/214,272, filed on Jun. 26, 2000.

(51) Int. Cl.[7] .................................................. B60J 5/10

(52) U.S. Cl. ............................... 296/146.4; 296/146.8; 49/343

(58) Field of Search ....................... 296/56, 106, 146.4, 296/146.8; 49/341, 343

(56) References Cited

U.S. PATENT DOCUMENTS 2,594,643 A * 4/1952 Gustisha ...................... 296/76
5,563,483 A 10/1996 Kowall et al.
5,851,050 A 12/1998 Squire et al.
6,055,776 A 5/2000 Dettling et al.
6,142,551 A * 11/2000 Ciavaglia et al. ............. 296/56
6,382,706 B2 * 5/2002 Yuge et al. .............. 296/146.4
6,516,567 B1 * 2/2003 Stone et al. .................. 49/343
6,550,839 B2 * 4/2003 Rogers et al. ................ 296/56
6,637,157 B1 * 10/2003 Dombrowski et al. ........ 49/341
6,669,268 B2 * 12/2003 Oberheide ............... 296/146.8

* cited by examiner

*Primary Examiner*—Dennis H. Pedder
(74) *Attorney, Agent, or Firm*—Clark Hill PLC

(57) ABSTRACT

A power drive assembly moves a liftgate (12) of a motor vehicle (10) between its open and closed positions. The motor vehicle (10) defines an opening and the liftgate (12) closes the opening when the liftgate (12) is in its closed position. The power drive assembly (22) includes a base (24) that is fixedly secured to the motor vehicle (10) at a position in spaced relation to the opening. A drive mechanism (38) is fixedly secured to the guide. The drive mechanism (38) converts electrical energy into a linear force. The power drive assembly (22) includes a translation linkage (58) connected to the drive mechanism (38) for receiving the linear force and translating it into a nonlinear force to move the liftgate (12) between the open position and the closed position. A nut (52), secured to the translation linkage (58), moves the translation linkage (58) as it travels along a lead screw (50) that is rotated by a motor (40).

6 Claims, 2 Drawing Sheets

LEAD SCREW DRIVE FOR A POWER LIFTGATE

This application claims the benefit of Provisional application Ser. No. 60/214,272, filed Jun. 26, 2000.

BACKGROUND ART

1. Field of the Invention

The invention relates to liftgate assemblies for motor vehicles. More specifically, the invention relates to a power drive assembly for a liftgate assembly for providing power to move the liftgate assembly between open and closed positions.

2. Description of the Related Art

As motor vehicles characterized by their utility become a mainstream choice, consumers demand certain luxuries primarily associated with passenger cars, either due to their inherent design and/or size. One of the features desired by consumers is the automated movement of such items as sliding doors and liftgates. While features providing automated motion are available, the designs for mechanisms used to accommodate manual overrides are lacking in capability and functionality. Further, the systems consume space within the motor vehicle that makes the interior less efficient and aesthetically less appealing.

U.S. Pat. No. 5,144,769 discloses an automatic door operating system. This system requires a great deal of control, both by an electronic controller and an operator of the motor vehicle. To overcome forces due to manual operation, the manually operated seesaw switch used by the operator to electromechanically operate the door is in an open state, preventing current from passing through the motor.

SUMMARY OP THE INVENTION

A power drive assembly for a motor vehicle is disclosed. The motor vehicle defines an opening and a liftgate that is pivotal between a closed position covering the opening and an open position providing access through the opening. The power drive assembly includes a base that is fixedly secured to the motor vehicle at a position in spaced relation to the opening. A drive mechanism is fixedly secured to the guide. The drive mechanism converts electrical energy into a linear force. The power drive assembly includes a translation linkage connected to the drive mechanism for receiving the linear force and translating it into a nonlinear force to move the liftgate between the open position and the closed position.

BRIEF DESCRIPTION OF THE DRAWINGS

Advantages of the invention will be readily appreciated as the same becomes better understood by reference to the following detailed description when considered in connection with the accompanying drawings, wherein.

DETAILED DESCRIPTION OF THE PREFERRED EMBODIMENT

Figure 1:
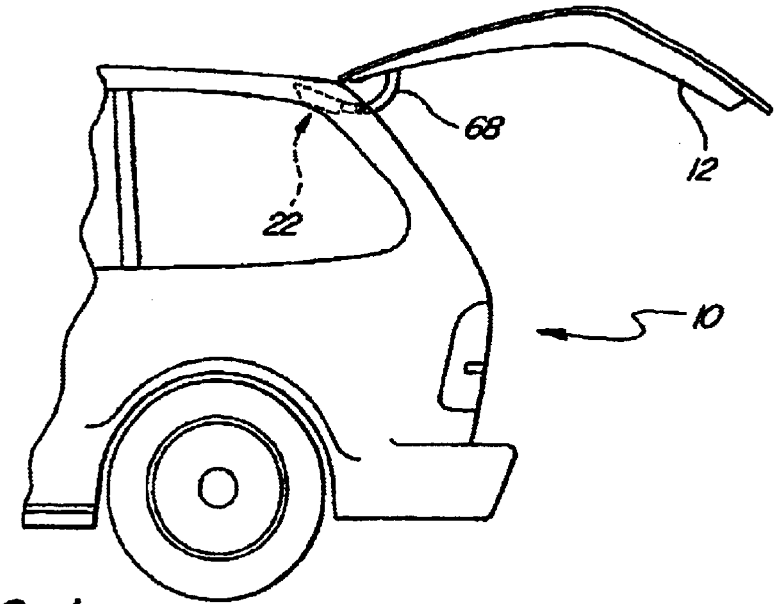
FIG. 1 is a side view, partially cut away, of a motor vehicle incorporating one embodiment of the invention wherein the liftgate is located in its open position.
Figure 3:
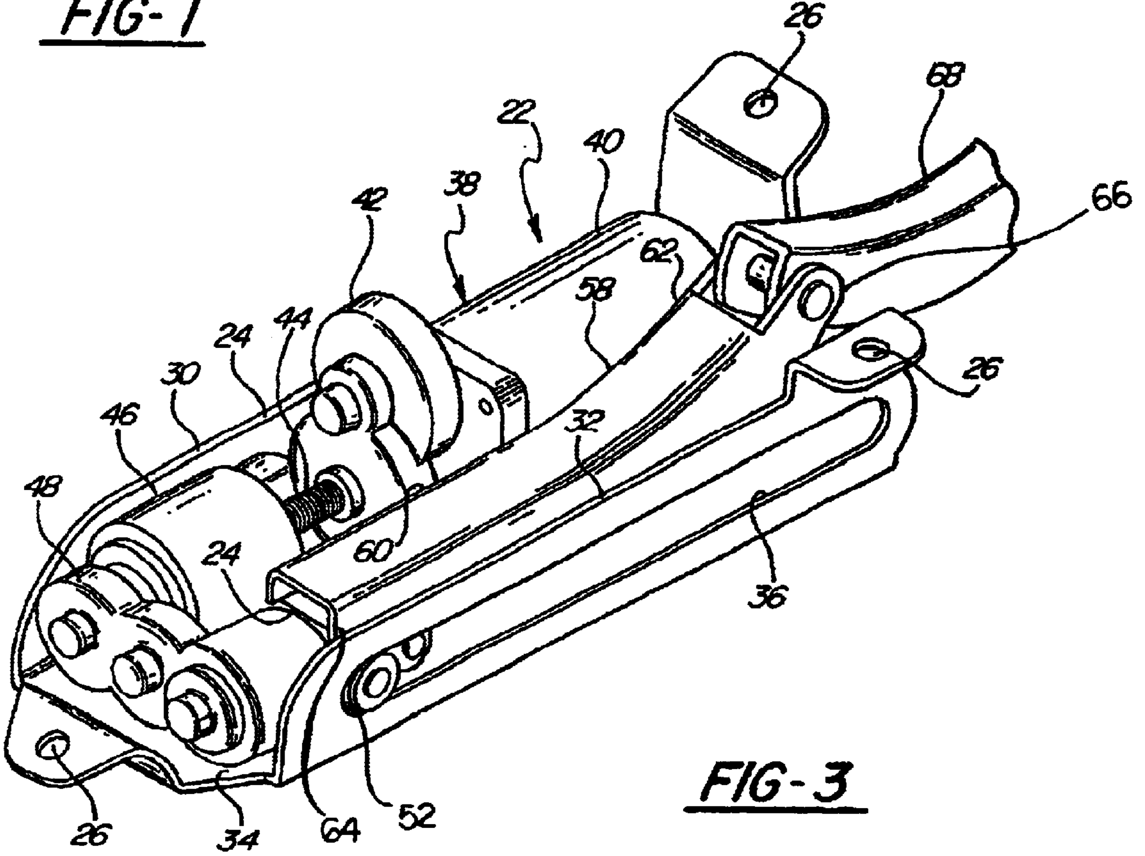
FIG. 3 is a perspective view of one embodiment of the invention.
Figure 2:
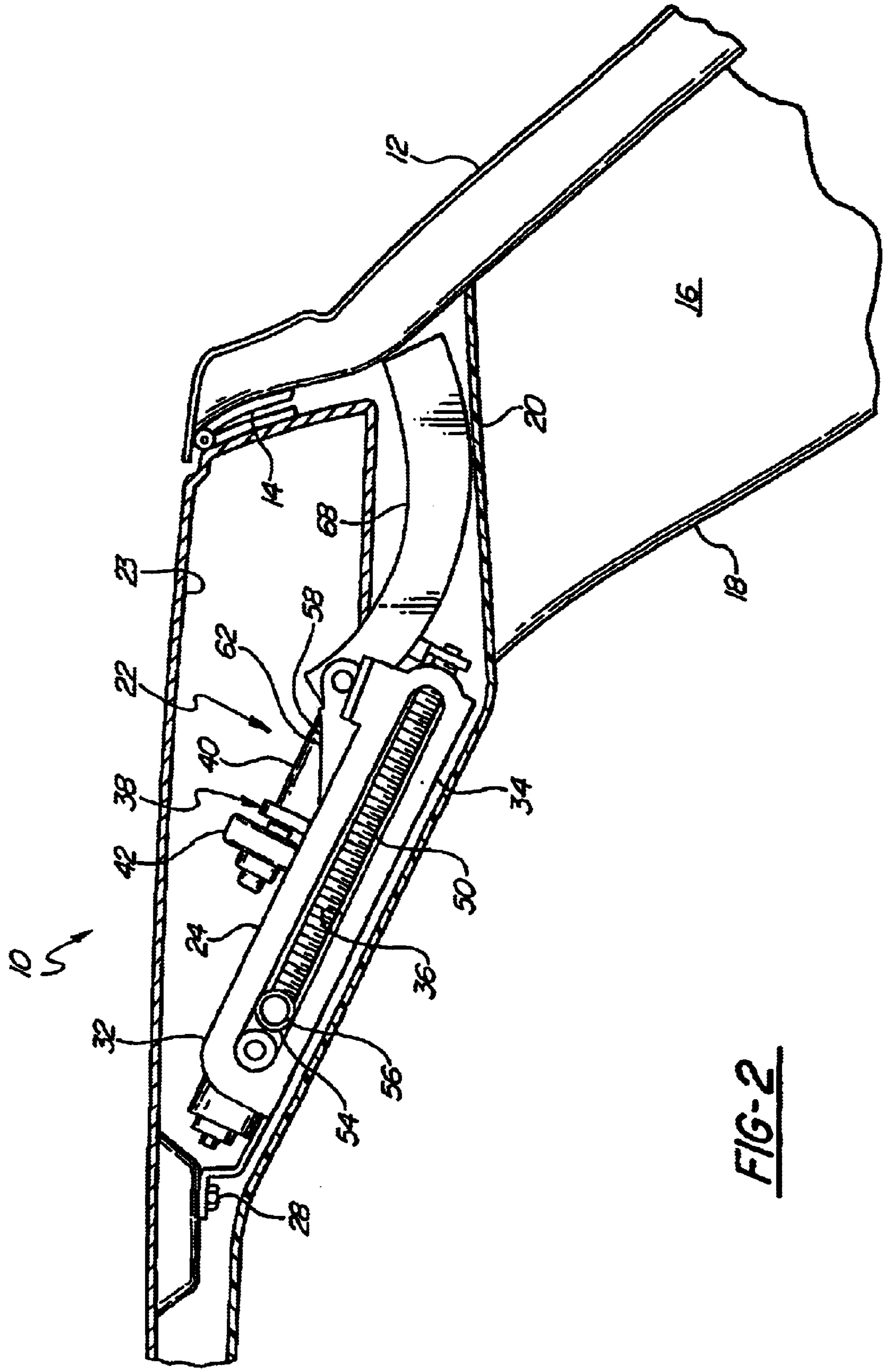
FIG. 2 is a cross-sectional side view of one embodiment of the invention in a motor vehicle with the liftgate in the closed position.

Referring to FIG. 1, a motor vehicle is generally indicated at 10. In the embodiment shown, the motor vehicle 10 is a minivan. The motor vehicle 10 includes a liftgate 12. The liftgate 12 is shown in an open position in FIG. 1 and a closed position in FIG. 2. It should be appreciated by those skilled in the art that the motor vehicle 10 and liftgate 12 could be configured differently depending on the style of the motor vehicle 10 and size of the liftgate 12.

The liftgate 12 is pivotally mounted to the motor vehicle 10 with a hinge 14. The hinge 14 allows the liftgate 12 to move between its two extreme positions shown in FIGS. 1 and 2.

When the liftgate 12 is in its open position, access is provided to the motor vehicle 10 through an opening 16. A piece of trim 18 extends along the sides (one shown) and a top 20 of the opening 16. The load floor (not shown) extends between the side trim 18 to create the bottom boundary for the opening 16.

The invention is a power drive assembly, generally indicated at 22, that moves the liftgate 12 between its two extreme positions. The power drive assembly 22 is fixedly secured to the motor vehicle 10 at a position disposed adjacent the opening 16 thereof. The power drive assembly 22 is secured to a roof structure 23 of the motor vehicle 10 such that the power drive assembly 22 extends above and is hidden from view by the top trim piece 20, typically referred to as the headliner. The power drive assembly 22 is secured to the roof structure 23 and an angle with respect thereto. More specifically, the power drive assembly 22 is not aligned nor is perpendicular to either the roof structure 23 or the liftgate 12 when the liftgate 12 is in the closed position.

The power drive assembly 22 includes a base 24. The base 24 includes a plurality of mounting holes 26 designed to receive fasteners 28 (one shown) therein. As should be appreciated by those skilled in the art, the screw fastener 28 shown in FIG. 2 may be one of several types of fasteners that may be used to secure the base 24 to the roof structure 23.

The base 24 includes two side flanges 30, 32. Both of the side flanges 30, 32 extend along the longitudinal sides of the base 24 generally perpendicular to a support section 34 of the base 24. The two side flanges 30, 32 and the support section 34 form a generally U-shaped cross section. The second side flange 32 includes a slot 36 extending therealong. The slot 36 is linear and will be discussed in greater detail subsequently.

The power drive assembly 22 includes a drive mechanism, generally indicated at 38. The drive mechanism 38 transforms electrical energy received from a power source (not shown) into mechanical energy providing the necessary force to move the liftgate 12 between its open and closed positions.

The drive mechanism 38 includes a motor 40. The motor 40 receives the electrical energy and converts it to a mechanical rotational energy. That energy is transmitted out of the motor 40 via an output shaft (not shown) and into a set of gears 42. The gears 42 eventually transmit the rotational energy through a shaft 44 to a clutch 46.

The clutch 46 allows an operator of the liftgate 12 to override the power drive assembly 22 and open or close the liftgate 12 manually. Therefore, the clutch 46 allows the operator to open or close the liftgate 12 at a speed other than that which is set by the power drive assembly 22. It should be appreciated by those skilled in the art that, without adding to the inventive concept shown herein, the clutch 46 may be removed in systems that do not permit manual operation.

A transmission 48 receives the output force from the clutch 46 and redirects it. The transmission 48 includes a plurality of gears that are rotatably mounted to the base 24.

The transmission 48 also is used to further increase torque output of the drive mechanism 38.

The output of the transmission 48 is also a rotating mechanical force. This force is used to rotate a lead screw 50. The lead screw 50 extends between the two side flanges 30, 32 and alongside the motor 40, set of gears 42, clutch 46.

A nut 52 threadingly engages the lead screw 50. The nut 52 is driven along the lead screw 50 by the rotation thereof. Therefore, the lead screw 50 defines the length of linear motion created by the power drive assembly 22. More specifically, the rotation of the motor 40 eventually translates into rotation of the lead screw 50 which, in turn, drives the nut 52 in a linear motion along the lead screw 50 and the nut 52 may only travel the length of the lead screw 50.

The nut 52 cannot rotate with the lead screw 50 because it is secured in its orientation by a guide roller 54. The guide roller 54 rotates about a pin 56 that is fixedly secured to the nut 52. The guide roller 54 rolls through the slot 36 in the second side flange 32. The guide roller 54, in combination with the pin 56, prevents the nut 52 from rotating with the lead screw 50 as it rotates. Thus, the nut 52 travels along the lead screw 50 when the lead screw 50 is being rotated by the drive mechanism 38.

The power drive assembly 22 also includes a translation linkage 58. The translation linkage 58 is secured to the nut 52 such that when the nut 52 travels along the lead screw 50, the translation linkage 58 moves along therewith. The translation linkage 58 includes a linear portion 60 and an arcuate portion 62. The translation linkage 58 extends between a drive end 64 and a bracket end 66. The linear portion 60 is disposed adjacent the drive end 64 whereas the arcuate portion 62 is disposed adjacent the bracket end 66. In the embodiment shown in the Figures, the linear portion 60 is greater in length than the arcuate portion 62.

Pivotally secured to the bracket end 66 of the translation linkage 58 is a bracket 68. The bracket 68 extends through an arc that terminates with a pivotal connection with the liftgate 12. More specifically, the bracket 68 extends between the translation linkage 58 and the liftgate 12. The arcuate path of the bracket 68 allows an opening 70 in the top trim piece 20 to be smaller. More specifically, the arcuate shape of the bracket 68 defines a constant cross-sectional area as the bracket 68 travels through the opening 70.

In opening the liftgate 12, the motor 40 and clutch 46 are energized forcing the lead screw 50 to rotate in a first direction. The nut 52 travels along the lead screw 50 away from the transmission 48 toward the bracket 68. In doing so, the translation linkage 58 moves in a linear fashion forcing the bracket 68 to move in a nonlinear manner. With the top trim piece 20 acting as a guide (with reinforcement, not shown), the bracket 68 moves along its arcuate path forcing the liftgate 12 toward its open position. While no connection is shown, a hinge may pivotally secure the bracket 68 to the liftgate 12. Once the liftgate 12 has completed its opening travel, the clutch 46 is de-energized, de-coupling the motor 40 from the lead screw 50. Gas struts (not shown) support the liftgate 12 in the open position.

Rotation of the motor 40 in the opposite direction moves the nut 52 along the lead screw 50 toward the transmission 48 forcing the liftgate 12 to return to its closed position for eventual latching.

The invention has been described in an illustrative manner. It is to be understood that the terminology, which has been used, is intended to be in the nature of words of description rather than of limitation.

Many modifications and variations of the invention are possible in light of the above teachings. Therefore, within the scope of the appended claims, the invention may be practiced other than as specifically described.

I claim:

1. A power drive assembly for a motor vehicle defining an opening, the motor vehicle including a liftgate pivotable between a closed position covering the opening and an open position providing access through the opening, said power drive assembly comprising:

a base fixedly secured to the motor vehicle at a position in spaced relation to the opening, said base including a side flange defining a slot cut therethrough;

a drive mechanism fixedly secured to said guide, said drive mechanism converting electrical energy into a linear force; and a translation linkage connected to said drive mechanism receiving said linear force and translating said linear force into a nonlinear force to move the liftgate between the open position and the closed position;

wherein said drive mechanism includes a motor for transforming electrical power into mechanical power to move said translation linkage and a lead screw for receiving said mechanical power to be rotated thereby.

2. A power drive assembly as set forth in claim 1 wherein said drive mechanism includes a nut threadingly engaged with said lead screw for travel along said lead screw when said lead screw rotates.

3. A power drive assembly as set forth in claim 2 wherein said nut includes a guide roller for travel through said slot as said nut travels along said lead screw.

4. A power drive assembly as set forth in claim 3 wherein said linkage includes a linear portion and an arcuate portion.

5. A power drive assembly as set forth in claim 4 wherein said linkage includes a drive end and a bracket end such that said linear portion is disposed adjacent said drive end and said arcuate portion is disposed adjacent said bracket end.

6. A power drive assembly as set forth in claim 5 including a bracket pivotally connected to said bracket end of said translation linkage.

* * * * *